(12) United States Patent
Park et al.

(10) Patent No.: US 11,984,051 B2
(45) Date of Patent: May 14, 2024

(54) DISPLAY DEVICE

(71) Applicant: LG DISPLAY CO., LTD., Seoul (KR)

(72) Inventors: Sangpil Park, Incheon (KR); Seokwon Ji, Incheon (KR); SangHoon Lee, Seoul (KR); Jongmoo Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 70 days.

(21) Appl. No.: 17/517,361

(22) Filed: Nov. 2, 2021

(65) Prior Publication Data

US 2022/0198966 A1 Jun. 23, 2022

(30) Foreign Application Priority Data

Dec. 23, 2020 (KR) .......................... 10-2020-0182402

(51) Int. Cl.
*G09F 9/30* (2006.01)
*G02F 1/1333* (2006.01)
*G06F 1/16* (2006.01)

(52) U.S. Cl.
CPC ........ *G09F 9/301* (2013.01); *G02F 1/133305* (2013.01); *G02F 1/133314* (2021.01); *G06F 1/1601* (2013.01); *G06F 1/1652* (2013.01); *G06F 1/1656* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 10,559,768 B2 | 2/2020 | Han et al. | |
| 2014/0295150 A1* | 10/2014 | Bower | B32B 25/20 |
| | | | 428/411.1 |
| 2016/0226021 A1* | 8/2016 | Lee | H10K 50/84 |
| 2021/0410306 A1* | 12/2021 | Xia | H05K 5/03 |

FOREIGN PATENT DOCUMENTS

| | | | | |
|---|---|---|---|---|
| CN | 105283311 A | | 1/2016 | |
| CN | 106061154 A | | 10/2016 | |
| CN | 110335546 A | * | 10/2019 | ....... G02F 1/133305 |
| CN | 110570760 A | | 12/2019 | |
| CN | 110827680 A | | 2/2020 | |
| CN | 110895901 A | | 3/2020 | |
| CN | 110970465 A | | 4/2020 | |
| CN | 111161633 A | | 5/2020 | |
| CN | 111243433 A | | 6/2020 | |
| KR | 20180079096 A | * | 7/2018 | |
| KR | 10-1888451 B1 | | 8/2018 | |
| KR | 10-2019-0080740 A | | 7/2019 | |

* cited by examiner

*Primary Examiner* — Shan Liu
(74) *Attorney, Agent, or Firm* — Birch, Stewart, Kolasch & Birch, LLP

(57) ABSTRACT

A display device includes a display panel, a mid frame disposed below the display panel and having a plurality of openings, a back plate disposed between the display panel and the mid frame and having a plurality of first patterns protruding toward the mid frame and corresponding to the plurality of openings, and a first adhesive unit disposed between the mid frame and the back plate. In one example, the first adhesive unit includes a plurality of first areas overlapping the plurality of openings, and a second area enclosing the plurality of first areas and being malleable than the first areas.

17 Claims, 17 Drawing Sheets

DISPLAY DEVICE

CROSS-REFERENCE TO RELATED APPLICATIONS

This application claims priority to Korean Patent Application No. 10-2020-0182402 filed on Dec. 23, 2020, in the Korean Intellectual Property Office, the entire contents of which are hereby expressly incorporated by reference into the present application.

BACKGROUND

Field

The present disclosure relates to a display device, and more particularly, to a rollable display device which is capable of displaying images even in a rolled state.

Description of the Related Art

As display devices which are used fora monitor of a computer, a television, or a cellular phone, there are an organic light emitting display (OLED) device which is a self-emitting device, a liquid crystal display (LCD) device which uses a separate light source, and the like.

An applicable range of the display device is diversified to personal digital assistants as well as monitors of computers and televisions, and a display device with a large display area and a reduced volume and weight is being studied.

Further, a rollable display device which is manufactured by forming a display element, a wiring line, and the like on a flexible substrate composed of a flexible material such as plastic, is capable of displaying images even in a rolled state of the display device. As s result, the rollable display device is getting attention as the next generation display device.

SUMMARY OF THE DISCLOSURE

An object to be achieved by the present disclosure is to provide a display device which suppresses the transference of a shape of an opening of a mid frame onto a display panel due to the adhesive layer which is pressed by a stress caused by the opening of the mid frame.

Another object to be achieved by the present disclosure is to provide a display device which minimizes the visual recognition of the shape of the opening of the mid frame to the user by using the display panel.

Objects of the present disclosure are not limited to the above-mentioned objects, and other objects, which are not mentioned above, can be clearly understood by those skilled in the art from the following descriptions.

In order to achieve the above-described and other objects, according to an aspect of the present disclosure, a display device includes a display panel, a mid frame which is disposed below the display panel and includes a plurality of openings, a back plate which is disposed between the display panel and the mid frame and includes a plurality of first patterns protruding toward the mid frame and corresponding to the plurality of openings, and a first adhesive unit which is disposed between the mid frame and the back plate and includes a plurality of first areas overlapping the plurality of openings and a second area which encloses the plurality of first areas and is malleable than the first areas.

In order to achieve the above-described and other objects, according to another aspect of the present disclosure, a display device includes a display panel in which an active area is defined, a mid frame which supports a rear surface of the display panel and includes a plurality of openings, a first adhesive unit which includes a plurality of first areas overlapping the plurality of openings and a second area which is malleable than the first areas and is disposed between the mid frame and the display panel, and a back plate which is disposed between the first adhesive unit and the display panel and includes a plurality of first patterns disposed to correspond to a position of the plurality of openings.

Other detailed matters of the exemplary embodiments are included in the detailed description and the drawings.

According to the present disclosure, an adhesive unit which is adjacent to the mid frame has a portion having a different modulus to minimize the stress caused by the opening of the mid frame.

According to the present disclosure, the transference of the shape of the opening of the mid frame onto the display panel is minimized to improve the visibility of the display device.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1A:
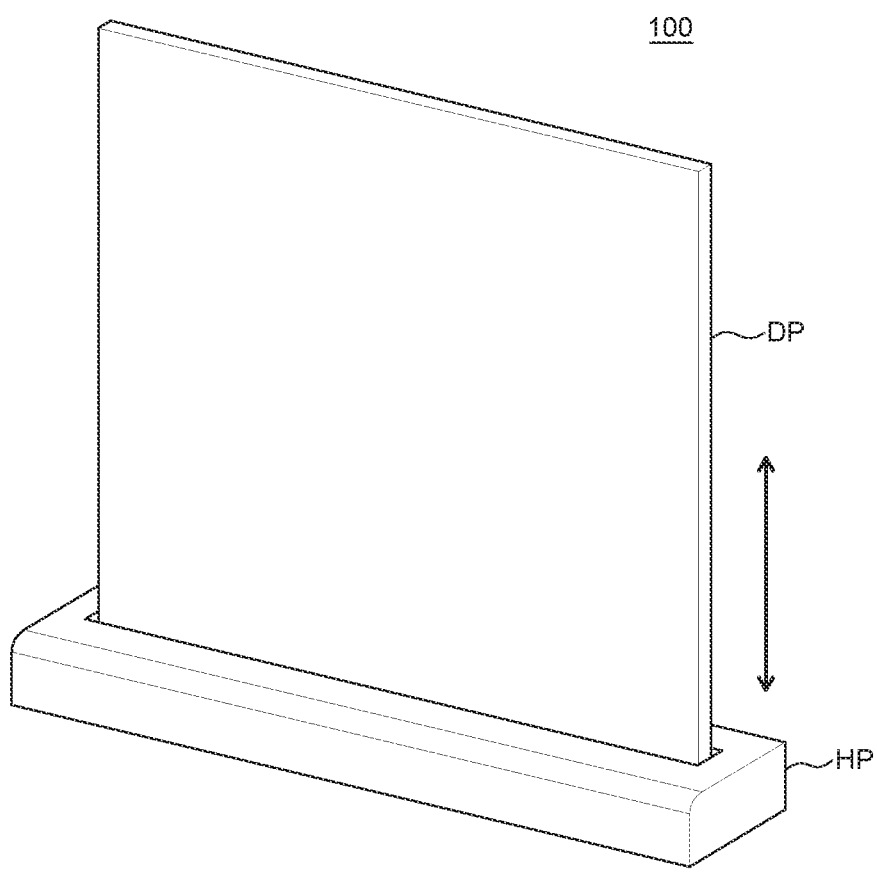
FIGS. 1A and 1B are perspective views of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" the other element or layer, another layer or another element can be interposed directly on the other element or therebetween.

Although the terms "first", "second", and the like are used for describing various components, these components are not confined by these terms. These terms are merely used for distinguishing one component from the other components and may not define order. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely bonded to or combined with each other and can be interlocked and operated in technically various ways, and the embodiments can be carried out independently of or in association with each other.

Hereinafter, various exemplary embodiments of the present disclosure will be described in detail with reference to accompanying drawings. In this regard, all components of each rollable display device according to all embodiments of the present disclosure are operatively coupled and configured.

<Display Device-Rollable Display Device>

A rollable display device can be referred to as a display device which is capable of displaying images even though the display device is rolled. The rollable display device can have a high flexibility as compared with a general display device of the related art. Depending on whether to use a rollable display device, a shape of the rollable display device can freely vary. Specifically, when the rollable display device is not used, the rollable display device is rolled to be stored with a reduced volume. In contrast, when the rollable display device is used, the rolled rollable display device is unrolled to be used.

Figure 1B:
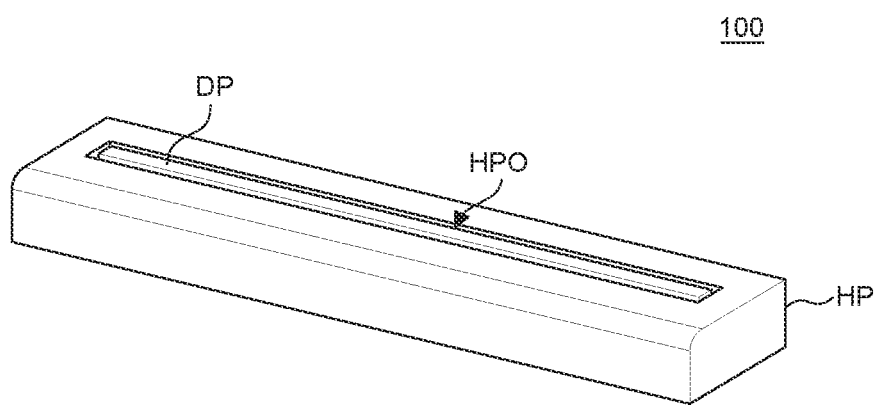

FIGS. 1A and 1B are perspective views of a display device according to an exemplary embodiment of the present disclosure.

Referring to FIGS. 1A and 1B, a display device 100 according to an exemplary embodiment of the present disclosure includes a display unit DP and a housing unit HP.

The display unit DP is a configuration for displaying images to a user and for example, in the display unit DP, a display element and a circuit, a wiring line, a component, and the like for driving the display element can be disposed. In this case, since the display device 100 according to the exemplary embodiment of the present disclosure is a rollable display device 100, the display unit DP can be configured to be wound and unwound. For example, the display unit DP can be formed of a display panel 120 and a mid frame 110 each having flexibility to be wound or unwound. The display unit DP will be described below in more detail with reference to FIGS. 4 and 5.

The housing unit HP is a case in which the display unit DP is accommodated. The housing unit HP has an opening HPO to allow the display unit DP to move to the inside and the outside of the housing unit HP.

In the meantime, the display unit DP of the display device 100 can be switched from a fully unwound state as illustrated in FIG. 1A to a fully wound state as illustrated in FIG. 1B or from a fully wound state to a fully unwound state.

In order to switch the display unit DP to a fully unwound state or a fully wound state, a driving unit MP which winds or unwinds the display unit DP is disposed.

<Driving Unit>

Figure 2A:
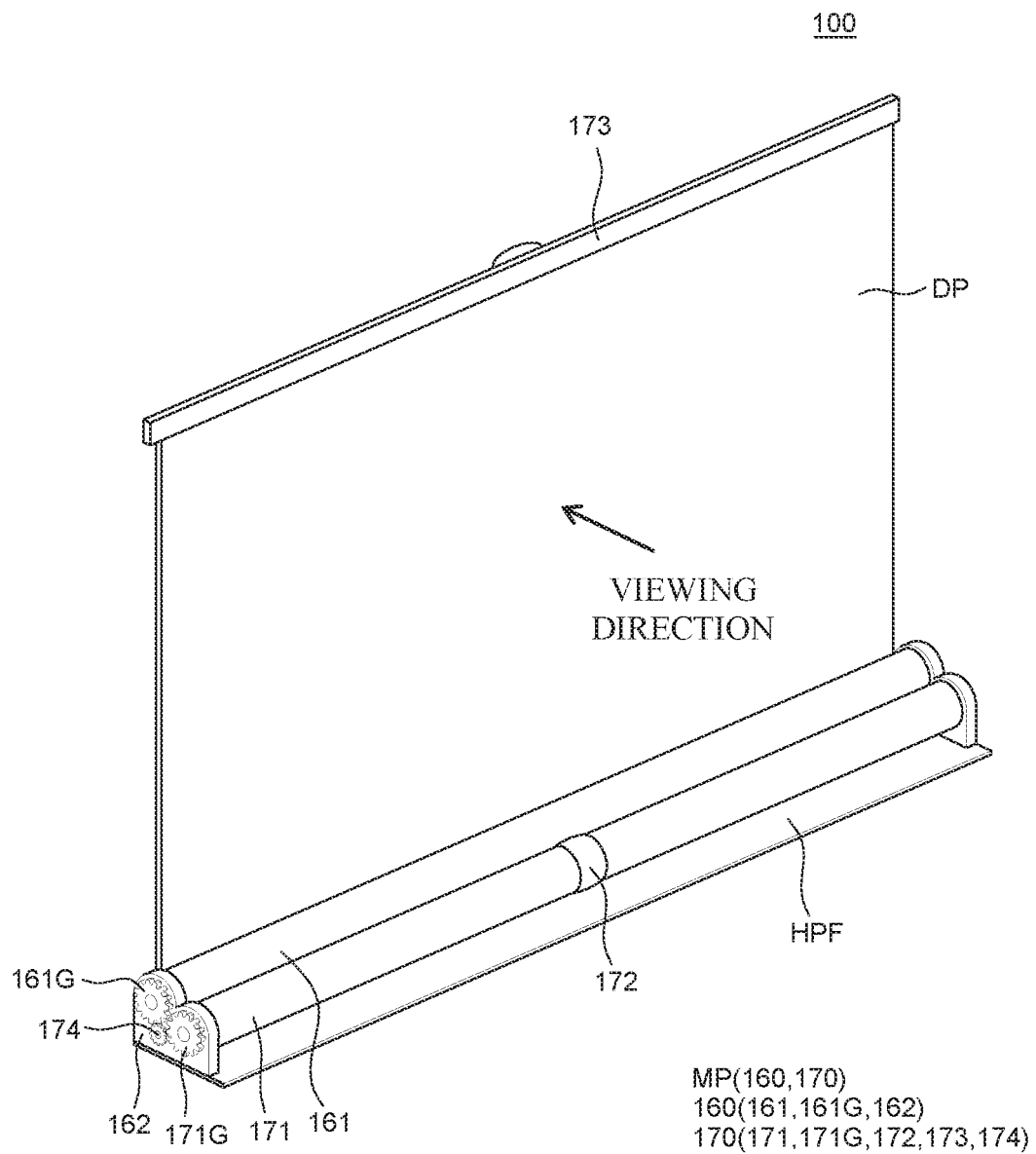
FIG. 2A is a front perspective view of a display device according to an exemplary embodiment of the present disclosure.
Figure 2B:
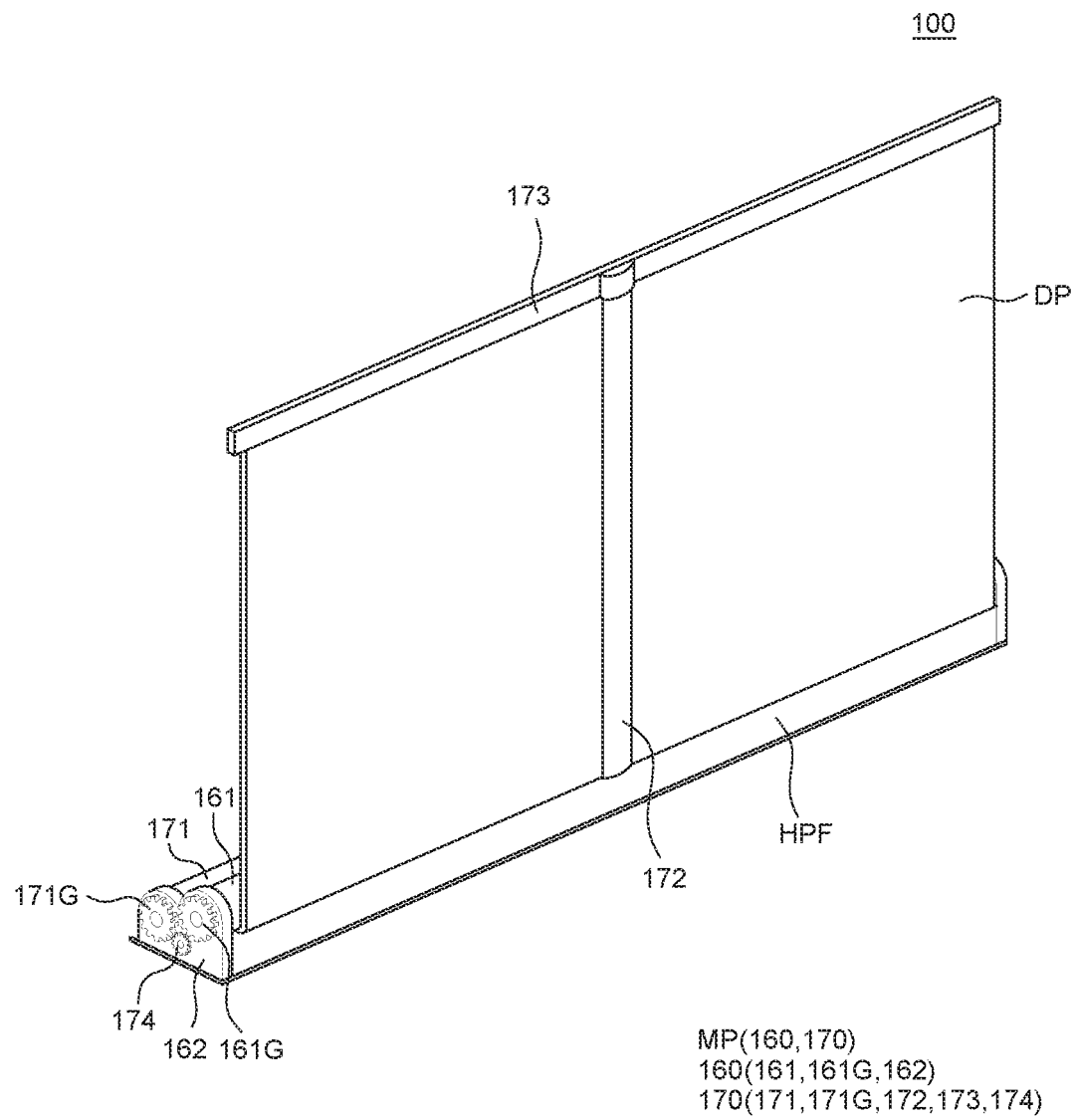
FIG. 2B is a rear perspective view of a display device according to an exemplary embodiment of the present disclosure.
Figure 3:
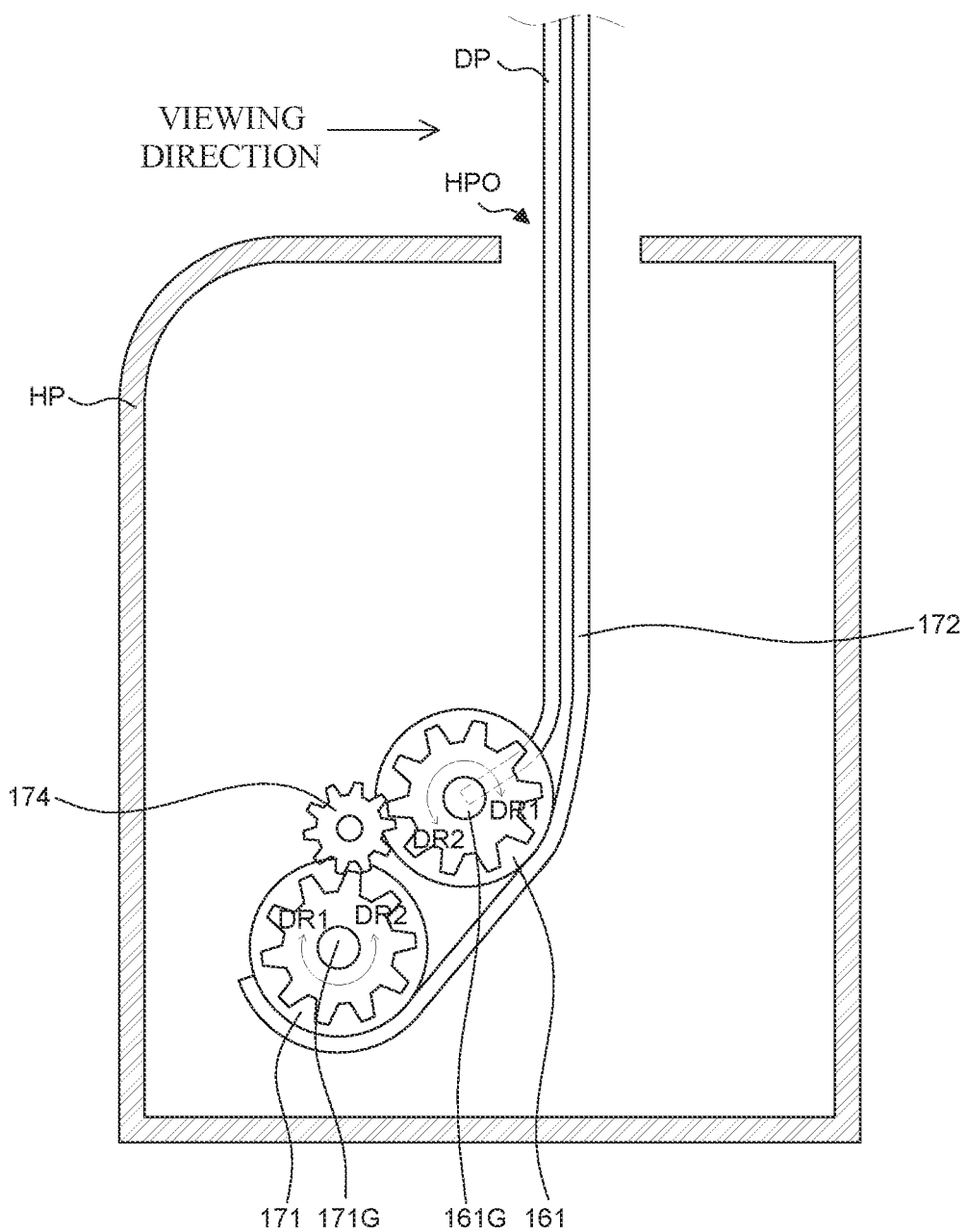
FIG. 3 is a schematic cross-sectional view of a display device according to an exemplary embodiment of the present disclosure.

FIG. 2A is a perspective view of a display device according to an exemplary embodiment of the present disclosure. FIG. 2B is a rear perspective view of a display device according to an exemplary embodiment of the present disclosure. FIG. 3 is a schematic cross-sectional view of a display device according to an exemplary embodiment of the present disclosure.

More specifically, FIG. 3 is a schematic cross-sectional view for explaining a roller 161 and a display unit DP of a display device 100 according to an exemplary embodiment of the present disclosure. For the convenience of description, in FIG. 3, only the housing unit HP, the roller 161, a gear 161G of the roller 161, an auxiliary roller 171, a gear 171G of the auxiliary roller 171, a supporting bar 172, an intermediate gear 174, and a display unit DP are illustrated.

First, referring to FIGS. 2A and 2B, the driving unit MP includes a roller unit 160 and a lifting unit 170.

The roller unit 160 rotates in a clockwise direction or a counterclockwise direction to wind or unwind the display unit DP fixed to the roller unit 160. The roller unit 160 includes the roller 161, the gear 161G of the roller 161, and a roller support unit 162.

The roller 161 is a member around which the display unit DP is wound. The roller 161 can be, for example, formed to have a cylindrical shape. A lower edge of the display unit DP can be fixed to the roller 161. When the roller 161 rotates, the display unit DP which is fixed to the roller 161 through the lower edge can be wound around the roller 161. In contrast, when the roller 161 rotates in an opposite direction, the display unit DP which is wound around the roller 161 can be unwound from the roller 161.

Referring to FIG. 3, the roller 161 can be formed to have a cylindrical shape with a curved outer circumferential surface. A part of the outer circumferential surface of the roller 161 is open and a plurality of flexible films 130 and a printed circuit board 140 of the display unit DP which are inserted through the opening can be seated in an inner space of the roller 161.

Referring to FIGS. 2A and 2B again, the roller support unit 162 supports the roller 161 at both sides of the roller 161. Specifically, the roller support unit 162 is disposed on a bottom surface HPF of the housing unit HP. Upper side surfaces of the roller support unit 162 are coupled to both ends of the roller 161. By doing this, the roller support unit 162 can support the roller 161 to be spaced apart from the bottom surface HPF of the housing unit HP. In this case, the roller 161 can be rotatably coupled to the roller support unit 162.

Referring to FIGS. 2A and 2B, the gear 161G of the roller 161 can be disposed on both sides of the roller 161. The position of the gear 161G of the roller 161 can vary on the roller 161, but is not limited thereto.

The gear 161G of the roller 161 is disposed on the roller 161 so that the gear 161G of the roller 161 and the roller 161 can rotate in the same direction. The gear 161G of the roller 161 is configured by a saw tooth gear having a plurality of saw teeth and transmits a rotational motion of the lifting unit 170 to the roller 161 to allow the roller 161 to be wound. At this time, a type of the gear 161G of the roller 161 can vary depending on the design, but is not limited thereto.

The lifting unit 170 supplies a power to move the display unit DP up and down. The lifting unit 170 includes the auxiliary roller 171, the gear 171G of the auxiliary roller 171, the supporting bar 172, a head bar 173, the intermediate gear 174, and a motor.

The auxiliary roller 171 of the lifting unit 170 can be formed to have a cylindrical shape with a curved outer circumferential surface.

The auxiliary roller 171 can be disposed to be parallel to the roller 161 and can be configured to be rotatable in the same direction as the roller 161. Referring to FIG. 2A, even though the auxiliary roller 171 can be supported by the roller support unit 162 together with the roller 161 to be spaced apart from the bottom surface HPF of the housing unit HP, the auxiliary roller can also be supported by a separate auxiliary roller support unit, but is not limited thereto.

The gear 171G of the auxiliary roller 171 is disposed on both sides of the auxiliary roller 171. The gear 171G of the auxiliary roller 171 is disposed in the auxiliary roller 171 to have the same rotary shaft as the auxiliary roller 171 to rotate in the same direction as the auxiliary roller 171 by the rotational motion of the auxiliary roller 171. Therefore, the gear 171G of the auxiliary roller 171 can be configured to transmit the rotational motion of the auxiliary roller 171 to the roller 161 via the intermediate gear 174.

The head bar 173 of the lifting unit 170 is fixed to an uppermost end of the display unit DP. The head bar 173 is connected to the supporting bar 172 to move the display unit DP in a vertical direction in accordance with the rotation of the auxiliary roller 171. For example, the display unit DP can move in a vertical direction by the supporting bar 172 and the head bar 173.

The head bar 173 covers only a part of a surface which is adjacent to an uppermost edge of the display unit DP so as not to hide an image displayed on the front surface of the display unit DP. The display unit DP and the head bar 173 can be fixed by a screw, but are not limited thereto.

One end of the supporting bar 172 is connected to the head bar 173 and the other end is connected to the auxiliary roller 171. Therefore, the supporting bar 172 can be configured to lift and lower the display unit DP while being wound around or unwound from the auxiliary roller 171. Specifically, the other end of the supporting bar 172 is connected to the auxiliary roller 171 so that the supporting bar 172 can be wound around the auxiliary roller 171. By doing this, one end of the supporting bar 172 can be lowered and the display unit DP can also be lowered by means of the head bar 173 connected to one end of the supporting bar 172.

The supporting bar 172 is configured to maintain a tension against the display unit DP by means of the head bar 173 to support the display unit DP. The supporting bar 172 can be disposed on a rear surface of the display unit DP in an opposite side of the watching direction. The supporting bar 172 can provide a tension like a plastic, a metal, a leaf spring, or the like and have a bar shape, but is not limited thereto.

Referring to FIGS. 2A and 3, the intermediate gear 174 can be disposed between the gear 161G of the roller 161 and the gear 171G of the auxiliary roller 171. The intermediate gear 174 can be disposed to rotate the roller 171 and the auxiliary roller 171 in the same direction. For example, the intermediate gear 174 can be a pinion gear, but is not limited thereto.

The motor is connected to a power generating unit, such as a separate external power source or a built-in battery, to be supplied with the power. The motor generates a rotational force to provide a driving force to the lifting unit 170. Specifically, the motor can rotate the auxiliary roller 171 and the rotational force in accordance with the rotation of the auxiliary roller 171 is transmitted to the roller 161 via the gear 171G of the auxiliary roller 171, the intermediate gear 174, and the gear 161G of the roller 161 to rotate the roller 161.

The motor interworks with the roller 161, the auxiliary roller 171, and the supporting bar 172 to lift and lower the display unit DP. The supporting bar 172 is connected to the auxiliary roller 171 to be supplied with the driving force from the motor to repeatedly perform a winding or unwinding operation.

Specifically, when the display unit DP is wound, the motor 175 is driven so that the supporting bar 172 can be wound around the auxiliary roller 171 of the lifting unit 170. For example, during the process of winding the supporting bar 172 around the auxiliary roller 171, the head bar 173 connected to the supporting bar 172 is also lowered and one end of the display unit DP connected to the head bar 173 is also lowered.

When the display unit DP is unwound, the motor is driven so that the supporting bar 172 can be unwound from the auxiliary roller 171 of the lifting unit 170. For example, during the process of unwinding the supporting bar 172 from the auxiliary roller 171 to be unfolded, the head bar 173 connected to one end of the supporting bar 172 is also lifted and the display unit DP connected to the head bar 173 is also lifted.

In the meantime, when the display unit DP is wound, the roller 161 can rotate and the display unit DP can be wound around the roller 161. Referring to FIG. 3, a lower edge of the display unit DP is coupled to the roller 161. When the roller 161 rotates in a first direction DR1, for example, a clockwise direction, the display unit DP can be wound while a rear surface of the display unit DP is in close contact with a surface of the roller 161.

When the display unit DP is unwound, the roller 161 can rotate and the display unit DP can be unwound from the roller 161. For example, referring to FIG. 3, when the roller 161 rotates in a second direction DR2, for example, in a counterclockwise direction, the display unit DP which is wound around the roller 161 is unwound from the roller 161 to be disposed at the outside of the housing unit HP.

In some exemplary embodiments, a driving unit MP having another structure other than the above-described driving unit MP can be applied to the display device 100. For example, as long as the display unit DP is wound and unwound, the above-described configuration of the roller unit 160 and the lifting unit 170 can be modified, some configurations can be omitted, or another configuration can be added.

<Display Unit>

Figure 4:
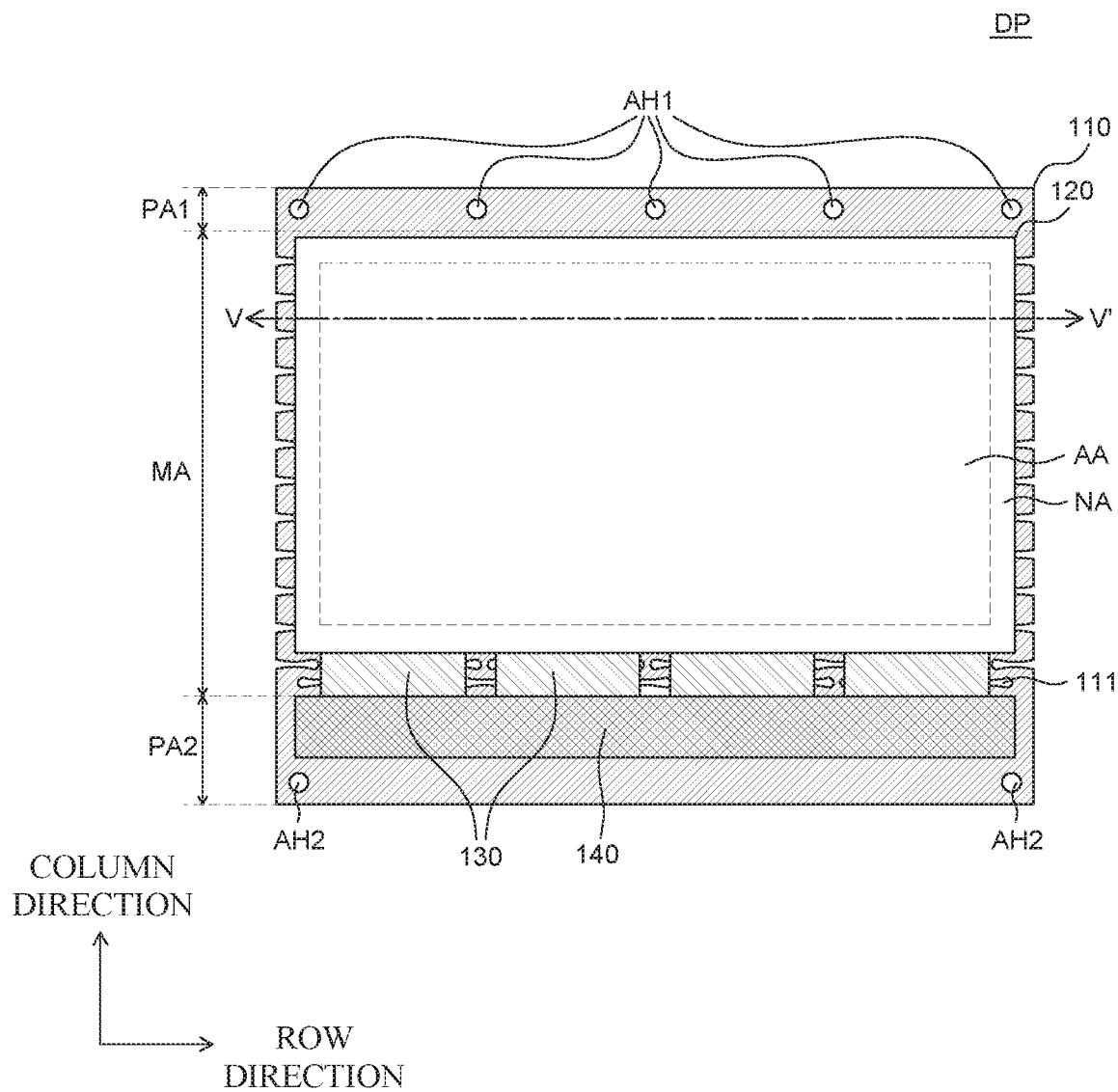
FIG. 4 is a plan view of a display unit of a display device according to an exemplary embodiment of the present disclosure.

FIG. 4 is a plan view of a display unit of a display device according to an exemplary embodiment of the present disclosure.

Referring to FIG. 4, the display unit DP includes a mid frame 110, a display panel 120, a flexible film 130, and a printed circuit board 140. However, it is not limited thereto and the display unit DP can be defined to include only a display panel 120, a plurality of flexible films 130, and a printed circuit board 140.

Referring to FIG. 4, the mid frame 110 is disposed below the display panel 120 to support the display panel 120. The mid frame 110 is disposed below the display panel 120, that is disposed on a rear surface, so that it is also referred to as a back cover. A size of the mid frame 110 can be larger than a size of the display panel 120. The mid frame 110 can protect other configurations of the display unit DP from the outside.

Even though the mid frame 110 is formed of a material having a rigidity, at least a part of the mid frame 110 can have a flexibility to be wound or unwound together with the display panel 120. For example, the mid frame 110 can be formed of a metal material such as steel use stainless (SUS) or invar, plastic, or the like. However, if the material of the mid frame 110 satisfies physical conditions such as a thermal strain, a radius of curvature, and a rigidity, the material can be diversely changed depending on the design, and is not limited thereto.

The mid frame 110 can be fastened with the head bar 173 and the roller 161.

The mid frame 110 includes a plurality of support areas PA and a malleable area MA. The plurality of support areas PA is areas where a plurality of openings 111 is not disposed and the malleable area MA is an area where a plurality of openings 111 is disposed. Specifically, the mid frame 110 includes a first support area PA1, a malleable area MA, and a second support area PA2 and the first support area PA1, the malleable area MA, and the second support area PA2 are sequentially disposed from an uppermost end of the mid frame 110. In this case, since the mid frame 110 is wound or unwound in a column direction, the plurality of support areas PA and the malleable area MA can be disposed along the column direction.

The first support area PA1 of the mid frame 110 is an uppermost area of the mid frame 110 and is fastened with the head bar 173. A first fastening area AH1 can be formed in the first supporting area PA1 to be fastened with the head bar 173. For example, screws which pass through the head bar 173 and the first fastening holes AH1 are disposed so that the head bar 173 and the first support area PA1 can be fastened with each other. As the first support area PA1 is fastened with the head bar 173, when the supporting bar 172 which is connected to the head bar 173 is lifted or lowered, the mid frame 110 can also be lifted and lowered together with the display panel 120 attached to the mid frame 110.

Even though five first fastening holes AH1 are illustrated in FIG. 4, the number of first fastening holes AH1 is not limited thereto. Further, even though it is described that the mid frame 110 is fastened with the head bar 173 using the first fastening holes AH1, it is not limited thereto and the mid frame 110 and the head bar 173 can be fastened with each other without using a separate fastening hole.

The malleable area MA of the mid frame 110 is an area extending from the first support area PA1 to a lower side of the mid frame 110. The malleable area MA of the mid frame 110 can have a plurality of openings 111. For example, the malleable area MA is an area in which a plurality of openings 111 is disposed and the display panel 120 is attached. Specifically, the malleable area MA is an area which is wound around or unwound from the roller 161 together with the display panel 120. The malleable area MA can overlap at least the display panel 120 among other configurations of the display unit DP.

The second support area PA2 of the mid frame 110 is an area which extends from the malleable area MA and is a lowermost side of the mid frame 110. One end of the display panel 120 is disposed in the second support area PA2. For example, a pad area which is a non-active area at one end of the display panel 120 can be disposed in the second support area PA2.

Referring to FIG. 4, a second fastening hole AH2 is disposed in the second support area PA2. The second fastening hole AH2 can be a hole to fix the roller 161 and the mid frame 110 to each other. Even though two second fastening holes AH2 are illustrated in FIG. 4, the number of second fastening holes AH2 is illustrative and is not limited thereto.

In the meantime, in the first support area PA1 and the second support area PA2, the plurality of openings 111 as formed in the malleable area MA is not formed. Specifically, in the first support area PA1 and the second support area PA2, only the first fastening holes AH1 and the second fastening holes AH2 are formed, but the plurality of openings 111 as formed in the malleable area MA is not formed. Further, the first fastening holes AH1 and the second fastening holes AH2 have different shapes from that of the plurality of openings 111.

The first support area PA1 is an area fixed to the head bar 173 and the second support area PA2 is an area where one end of the display panel 120, the plurality of flexible films 130, and the printed circuit board 140 are supported and has a rigidity larger than that of the malleable area MA. As the first support area PA1 and the second support area PA2 have the rigidity, the first support area PA1 and the second support area PA2 can be firmly fixed to the head bar 173 and the roller 161. The second support area PA2 maintains the pad area at one end of the display panel 120 and the printed circuit board 140 to be flat to protect the pad area of the display panel 120 and the printed circuit board 140. Therefore, the display unit DP is fixed to the head bar 173 of the driving unit MP to move to the inside or the outside of the housing unit HP in accordance with the operation of the driving unit MP and protect the pad area at one end of the display panel 120 and the printed circuit board 140.

In the meantime, in FIG. 4, even though it is illustrated that the plurality of support areas PA and the malleable area MA of the mid frame 110 are sequentially disposed along the column direction, when the mid frame 110 is wound in a row direction, the plurality of support areas PA and the malleable area MA can be sequentially disposed along the row direction.

When the display unit DP is wound or unwound, the plurality of openings 111 disposed in the malleable area MA of the mid frame 110 can be deformed by a stress which is applied to the display unit DP. Specifically, when the display unit DP is wound or unwound, the malleable area MA of the mid frame 110 can be deformed as the plurality of openings 111 contracts or expands. Further, as the plurality of openings 111 contracts or expands, a slip phenomenon of the display panel 120 disposed on the malleable area MA of the mid frame 110 is minimized so that the stress which is applied to the display panel 120 can be minimized.

Referring to FIG. 4, the display panel 120 is disposed on one surface of the mid frame 110. The display panel 120 is disposed in the malleable area MA, on one surface of the mid frame 110. The display panel 120 is a panel for displaying images to a user. The display panel 120 can include a display element which displays images, a driving element which drives the display element, wiring lines which transmit various signals to the display element and the driving element, and the like.

The display element can be defined in different manners depending on the type of the display panel 120. For example, when the display panel 120 is an organic light emitting display panel 120, the display element can be an organic light emitting diode which includes an anode, an organic light emitting layer, and a cathode. For example, when the display panel 120 is a liquid crystal display panel, the display element can be a liquid crystal display element. Hereinafter, even though the display panel 120 is assumed as an organic light emitting display panel, the display panel 120 is not limited to the organic light emitting display panel. Further, since the display device 100 according to the exemplary embodiment of the present disclosure is a rollable display device 100, the display panel 120 can be implemented as a flexible display panel 120 to be wound around or unwound from the roller 161.

The display panel 120 includes an active area AA and a non-active area NA.

The active area AA is an area where images are displayed in the display panel 120. In the active area AA, a plurality of sub pixels which configures the plurality of pixels and a driving circuit for driving the plurality of sub pixels can be disposed. The plurality of sub pixels is minimum units which configure the active area AA and a display element can be disposed in each of the plurality of sub pixels. For example, an organic light emitting diode which includes an anode, an organic light emitting layer, and a cathode can be disposed in each of the plurality of sub pixels, but it is not limited thereto. Further, a driving circuit for driving the plurality of sub pixels can include a driving element, a wiring line, and the like. For example, the driving circuit can be configured by a thin film transistor, a storage capacitor, a gate line, a data line, and the like, but is not limited thereto.

The non-active area NA is an area where no image is displayed. In the non-active area NA, various wiring lines and circuits for driving the organic light emitting diode of the active area AA are disposed. For example, in the non-active area NA, a link line which transmits signals to the plurality of sub pixels and driving circuits of the active area AA, a driving IC such as a gate driver IC or a data driver IC, or the like can be disposed, but it is not limited thereto.

In the meantime, the non-active area NA includes a pad area.

The pad area is an area in which a plurality of pads is disposed. The plurality of pads is electrodes which electrically connect the plurality of flexible films 130 and the display panel 120 to each other so that the plurality of flexible films 130 and the display panel 120 are electrically connected by the plurality of pads. The pad area can be a non-active area NA which overlaps the second support area PA2 of the mid frame 110 in the non-active area NA. However, the pad area can be formed in the other part of the non-active area NA depending on the arrangement of the plurality of flexible films 130, but is not limited thereto.

Referring to FIG. 4, a plurality of flexible films 130 is disposed at one end of the display panel 120. The plurality of flexible films 130 is films in which various components are disposed on a base film having a malleability to supply a signal to the plurality of sub pixels which configure plurality of pixels of the active area AA and the driving circuits and is electrically connected to the display panel 120. One ends of the plurality of flexible films 130 are disposed in the non-active area NA of the display panel 120 to supply a power voltage, a data voltage, or the like to the plurality of sub pixels and the driving circuits of the active area AA. In the meantime, even though four flexible films 130 are illustrated in FIG. 4, the number of flexible films 130 can vary depending on the design, but is not limited thereto.

A driving IC such as a gate driver IC or a data driver IC can be disposed on a base film of the plurality of flexible films 130. The driving IC is a component which processes data for displaying images and a driving signal for processing the data. The driving IC can be disposed by a chip on glass (COG), a chip on film (COF), a tape carrier package (TCP) technique, or the like depending on a mounting method, but is not limited thereto.

In the meantime, the plurality of flexible films 130 is components in which a base film, data for displaying images on the base film, and various driving ICs which control the data are disposed to display images. The plurality of flexible films 130 is electrically connected to the pad area at one end of the display panel 120 to be bent toward a rear surface of the mid frame 110. One ends of the plurality of flexible films 130 are connected to one end of the display panel 120 on one surface of the mid frame 110 and the other ends of the plurality of flexible films 130 can be disposed at an opposite surface of the one surface of the mid frame 110, but is not limited thereto.

Referring to FIG. 4, the printed circuit board 140 is disposed on the rear surface of the mid frame 110 to be connected to the plurality of flexible films 130. For example, the printed circuit board 140 is disposed on the rear surface of the mid frame 110 to be electrically connected to the plurality of flexible films 130. The printed circuit board 140 is a component which supplies signals to the driving IC of the plurality of flexible films 130. Various components can be disposed in the printed circuit board 140 to supply various signals such as a driving signal or a data signal to the driving IC. In the meantime, even though one printed circuit board 140 is illustrated in FIG. 4, the number of printed circuit boards 140 can vary depending on the design and is not limited thereto.

In FIG. 4, an additional printed circuit board which is connected to the printed circuit board 140 can be further disposed. For example, the printed circuit board 140 can be referred to as a source printed circuit board S-PCB on which the data driver is mounted and the additional printed circuit board connected to the printed circuit board 140 can be referred to as a control printed circuit board C-PCB on which a timing controller and the like is mounted. The additional printed circuit board can be disposed in the roller 161 or disposed in the housing unit HP at the outside of the roller 161, or disposed to be in direct contact with the printed circuit board 140.

<First Adhesive Unit and Back Plate>

Figure 5:
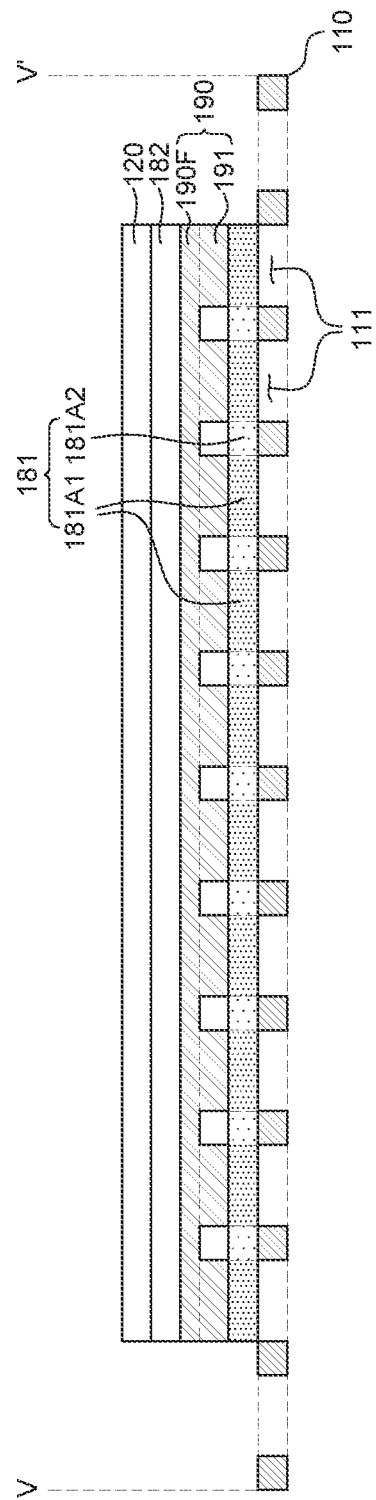
FIG. 5 is a cross-sectional view taken along the line V-V' of FIG. 4.
Figure 6A:
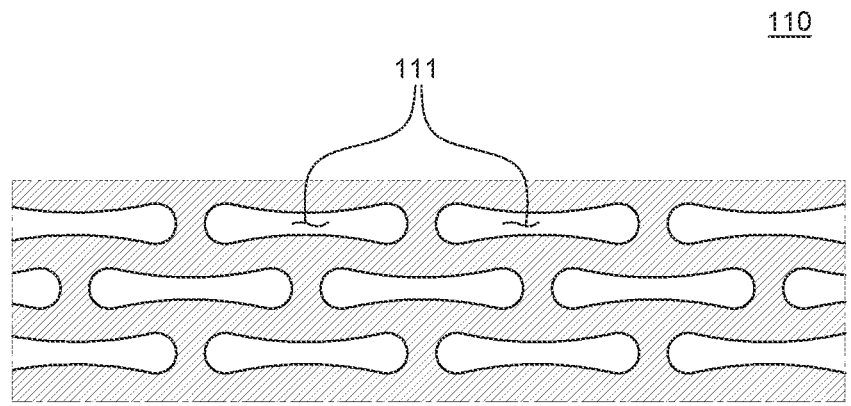
FIG. 6A is an enlarged plan view of a mid frame of a display device according to an exemplary embodiment of the present disclosure.
Figure 6B:
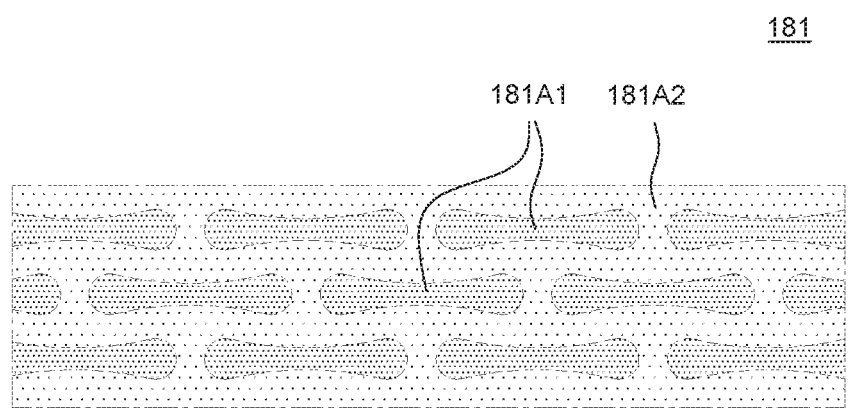
FIG. 6B is an enlarged plan view of a first adhesive unit of a display device according to an exemplary embodiment of the present disclosure.
Figure 6C:
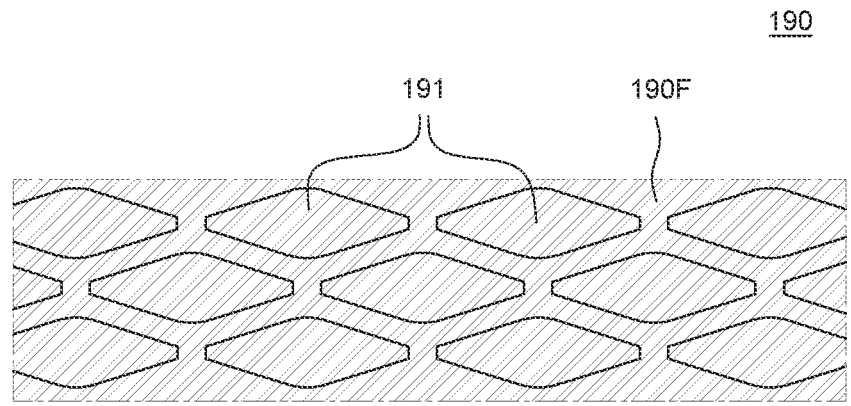
FIG. 6C is an enlarged plan view of a back plate of a display device according to an exemplary embodiment of the present disclosure.
Figure 6D:
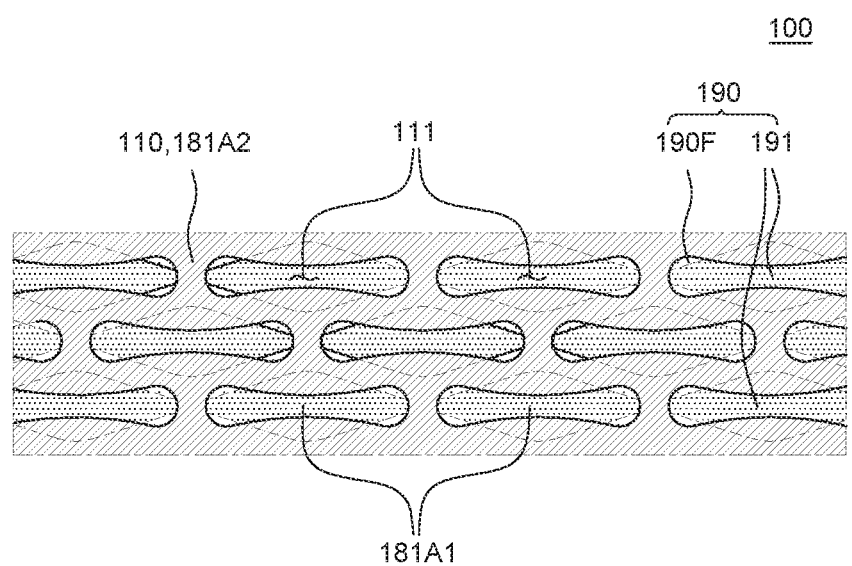
FIG. 6D is an enlarged plan view of an overlapping state of a mid frame, a first adhesive unit, and a back plate of a display device according to an exemplary embodiment of the present disclosure.

FIG. 5 is a cross-sectional view taken along the line V-V' of FIG. 4. FIG. 6A is an enlarged plan view of a mid frame of a display device according to an exemplary embodiment of the present disclosure. FIG. 6B is an enlarged plan view of a first adhesive unit of a display device according to an exemplary embodiment of the present disclosure. FIG. 6C is an enlarged plan view of a back plate of a display device according to an exemplary embodiment of the present disclosure. FIG. 6D is an enlarged plan view of an overlapping state of a mid frame, a first adhesive unit, and a back plate of a display device according to an exemplary embodiment of the present disclosure.

Referring to FIG. 5, the display unit DP can further include a first adhesive unit 181, a back plate 190, and a second adhesive unit 182 between the display panel 120 and the mid frame 110.

The first adhesive unit 181 is disposed between the mid frame 110 and the display panel 120 and specifically, disposed between the mid frame 110 and the back plate 190. For example, the first adhesive unit 181 can be disposed on one surface of the mid frame 110 which is disposed toward the display panel 120. Therefore, the first adhesive unit 181 can function to attach the mid frame 110 to the back plate 190.

The first adhesive unit 181 is formed of a material having an adhesiveness and can be a thermosetting adhesive. For example, the first adhesive unit 181 can be formed of a material such as ester, acrylic, acetate-based pressure sensitive adhesive PSA, but is not limited thereto and can vary to various materials depending on the design.

The first adhesive unit 181 includes a plurality of first area 181A1 and a second area 181A2.

The plurality of first areas 181A1 can be disposed to overlap the plurality of openings 111 of the mid frame 110. Therefore, a shape of the plurality of first areas 181A1 can correspond to a shape of the plurality of openings 111 of the mid frame 110, and for example, can have the same shape.

The plurality of first areas 181A1 can be areas which are cured by light such as UV. At this time, a Young's modulus of the plurality of first areas 181A1 can be approximately $10^9$ Pa, but is not limited thereto.

The second areas 181A2 can be areas which enclose the plurality of first areas 181A1. For example, the second areas 181A2 can be the remaining area of the first adhesive unit 181 excluding the plurality of first areas 181A1.

The second area 181A2 can be malleable than the first area 181A1. As described above, the first area 181A1 is an area which is photo-cured and the second area 181A2 is an area which is not photo-cured so that the second area 181A2 can be malleable than the first area 181A1. For example, the Young's modulus of the second area 181A2 can be lower than that of the first area 181A1 and can be approximately $10^{-5}$ Pa, but is not limited thereto.

The plurality of first areas 181A1 and second areas 181A2 can be integrally formed. For example, the plurality of first areas 181A1 and second areas 181A2 can be integrally formed without having a separate interface. However, it is not limited thereto so that the plurality of first areas 181A1 and second areas 181A2 can be separated areas.

The back plate 190 can be disposed between the display panel 120 and the mid frame 110. Specifically, the back plate 190 can be disposed between the first adhesive unit 181 and the second adhesive unit 182.

The back plate 190 includes a plurality of first patterns 191 which protrudes toward the mid frame 110 and corresponds to the plurality of openings 111. The plurality of first patterns 191 of the back plate 190 can be disposed on the bottom portion 190F of the back plate 190. Specifically, the back plate 190 includes the bottom portion 190F which is flat and the plurality of first patterns 191 is disposed on one surface of the bottom portion 190F which is opposite to the mid frame 110. At this time, the bottom portion 190F and the plurality of first patterns 191 can be integrally formed or separately formed to be connected.

For example, the back plate 190 can be formed of a metal material, a plastic material, or the like having a high rigidity. At this time, when the back plate 190 is formed of a metal material having a high thermal conductivity, the back plate 190 can perform a function of dissipating heat generated in the display unit DP to the outside.

Referring to FIG. 5, even though it is illustrated that a space between the plurality of first patterns 191 of the back plate 190 is empty, in space between the first patterns 191, the first adhesive unit 181 can be disposed depending on the design so that the empty space is filled, but is not limited thereto.

The second adhesive unit 182 is disposed between the back plate 190 and the display panel 120. Therefore, the second adhesive unit 182 can function to bond the back plate 190 to the display panel 120.

The second adhesive unit 182 is formed of a material having an adhesiveness and can be a thermosetting or natural curable type adhesive. For example, the second adhesive unit 182 can be formed of an acrylic material such as an optical clear adhesive OCA or a pressure sensitive adhesive PSA, but is not limited thereto and can vary depending on the design.

Referring to FIG. 6A, in the opening 111 of the mid frame 110, a width in the row direction is larger than a width in the column direction and the width in the column direction becomes narrower as it is closer to a center point of the opening 111. For example, the width of the opening 111 in a minor axis direction becomes narrower as it is closer to the center point of the opening 111 in a major axis direction. The mid frame 110 can have a peanut shape or a dumbbell shape, but is not limited thereto.

Referring to FIG. 6B, the first area 181A1 of the first adhesive unit 181 can completely overlap the plurality of openings with the same shape and the same size. For example, the first area 181A1 can have the same shape and the same size as the plurality of openings 111 and the center point of the opening 111 and the center point of the first area 181A1 can be disposed to overlap.

Referring to FIG. 6C, the first pattern 191 of the back plate 190 has a shape in which a width in the row direction is larger than a width in the column direction and the width in the column direction is narrower as it is farther from the center point of the first pattern 191. For example, the first pattern 191 has a major axis extending in the same direction as the major axis of the opening 111 and has a minor axis extending in the same direction as the minor axis of the opening 111. The width of the first pattern 191 in the minor axis direction can be narrower as it is farther from the center point of the first pattern 191 in the major axis direction. The shape of the first pattern 191 can be, as illustrated in FIG. 6C, a rhombus shape, but is not limited thereto.

Referring to FIG. 6D, in a portion in which the width of the opening 111 in the minor axis direction is small, the width of the first pattern 191 in the minor axis direction is large. Further, the farther from the center point of the opening 111, the larger the width of the opening 111 in the minor axis direction, but the smaller the width of the first pattern 191 in the minor axis direction.

In the display device of the related art, the plurality of openings 111 is disposed in the malleable area of the mid frame 110 so that the mid frame 110 supports the display panel 120 and is easily wound or unwound together with the display panel 120. However, a pressure which is generated when the display panel 120 and the mid frame 110 are wound or unwound or a pressure which is generated during the process of bonding the display panel 120 and the mid frame 110 may cause a stress in the area where the opening 111 of the mid frame 110 is disposed. Therefore, there can be a problem in that the boundary of the opening 111 of the mid frame 110 is transferred onto the flexible display panel 120 so that the shape of the opening 111 is visible to the user. Therefore, a visibility of the display panel 120 can deteriorate, and an unevenness defect in which curves occur on the entire surface of the display panel 120 can be caused.

In the display device 100 according to the exemplary embodiment of the present disclosure, the first area 181A1 of the first adhesive unit 181 corresponding to a shape of the opening 111 of the mid frame 110 has a rigidity larger than that of the second area 181A2 and the first pattern 191 of the back plate 190 is disposed to correspond to the opening 111 of the mid frame 110. By doing this, the pressing of the first adhesive unit 181 can be minimized and the transference of the boundary of the opening 111 of the mid frame 110 onto the display panel 120 can be suppressed. Specifically, the Young's modulus of the first area 181A1 of the first adhesive unit 181 is higher than that of the second area 181A2 and the first area 181A1 is disposed to overlap the opening 111 of the mid frame 110. Therefore, a phenomenon that the first adhesive unit 181 is pressed during the winding or unwinding of the display panel 120 and the mid frame 110 and during the process of bonding the display panel 120 and the mid frame 110 can be minimized by the first area 181A1 having a rigidity.

Further, the back plate 190 having a high rigidity is disposed between the mid frame 110 and the display panel 120 to suppress the strong pressing phenomenon which may be generated along the boundary of the opening 111 of the mid frame 110. Specifically, the first pattern 191 having a large width in the minor axis direction is disposed in an area of the opening 111 having a small width in the minor axis to which a strong stress due to the pressing is generated to relieve the stress generated in the area of the opening 111 having a smaller width in the minor axis direction.

Accordingly, in the display device 100 according to the exemplary embodiment of the present disclosure, the pressing phenomenon of the first adhesive unit 181 which may be caused by the plurality of openings 111 of the mid frame 110 is improved. Further, the deterioration of the visibility which may be caused by the shape of the opening 111 which is visibly recognized by the user can be minimized and the unevenness defect in which the curves are generated on the entire surface of the display panel 120 can be suppressed.

Figure 7:
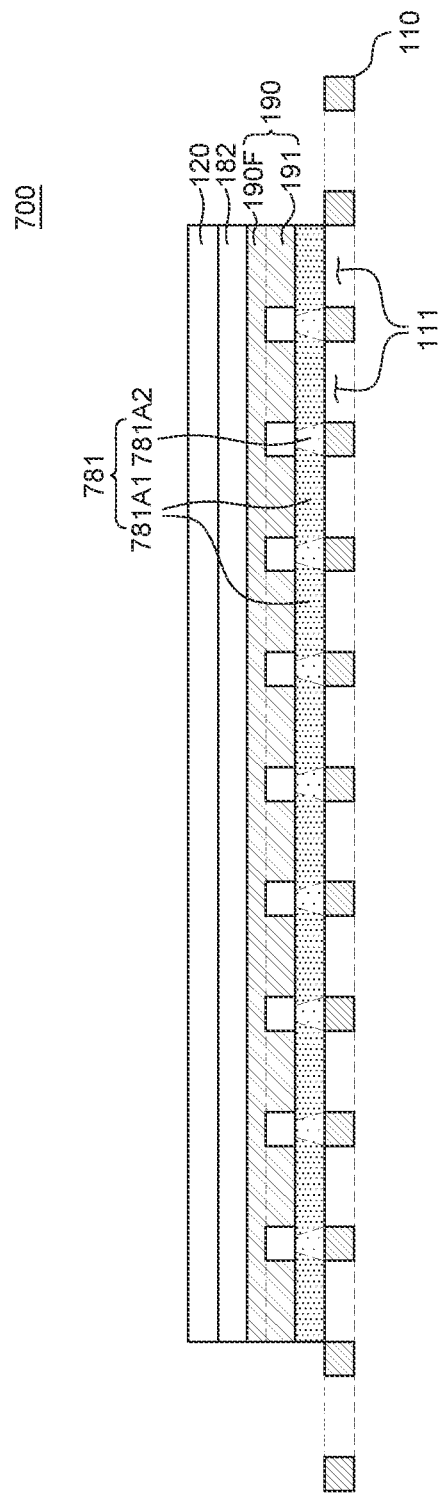
FIG. 7 is a cross-sectional view of a display device according to another exemplary embodiment of the present disclosure.

FIG. 7 is a cross-sectional view of a display device according to another exemplary embodiment of the present disclosure. The only difference or one difference between a display device 700 of FIG. 7 and the display device 100 of FIGS. 1 to 6D is a first adhesive unit 781, but the other configurations are the same or substantially the same, so that a redundant description will be omitted or may be briefly provided.

Referring to FIG. 7, first, the first adhesive unit 781 includes a plurality of first areas 781A1 and second areas 781A2.

The plurality of first areas 781A1 can be disposed to overlap the plurality of openings 111 of the mid frame 110. Therefore, a shape of the plurality of first areas 781A1 can correspond to a shape of the plurality of openings 111 of the mid frame 110, and for example, can have the same shape.

The plurality of first areas 781A1 can be areas which are cured by light such as UV. At this time, a Young's modulus of the plurality of first areas 781A1 can be approximately $10^9$ Pa, but is not limited thereto.

The second areas 781A2 can be areas which enclose the plurality of first areas 781A1. For example, the second area 781A2 can be the remaining area of the first adhesive unit 781 excluding the plurality of first areas 781A1.

The second area 781A2 can be malleable than the first area 781A1. As described above, the first area 781A1 is an area which is photo-cured and the second area 781A2 is an area which is not photo-cured so that the second area 781A2 can be malleable than the first area 781A1. For example, the Young's modulus of the second area 781A2 can be lower than that of the first area 781A1 and can be approximately $10^{-5}$ Pa, but is not limited thereto.

Referring to FIG. 7, in the display device 700 according to another exemplary embodiment of the present disclosure, bottom surfaces of the plurality of first areas 781A1 overlap the plurality of openings 111 and the cross-sectional areas of the plurality of first areas 781A1 are gradually increased from the bottom surface to the top surface on the cross-section. For example, an area of the top surface of each of the plurality of first areas 781A1 is larger than the cross-sectional area of each of the plurality of openings 111.

Specifically, the plurality of first areas 781A1 can be areas formed by curing the first adhesive unit 781 exposed through the opening 111 by light irradiated from the other surface which is opposite to one surface of the mid frame 110 on which the bottom surface of the first adhesive unit 781 is disposed. At this time, the light emitted from the other surface of the mid frame 110 is diffracted by the straightness of the light to cure an area of the top surface of the first adhesive unit 781 larger than the bottom surface of the first adhesive unit 781. Accordingly, the area of the top surface of each of the plurality of first areas 781A1 can be larger than the cross-sectional areas of each of the plurality of openings 111.

In the display device 700 according to another exemplary embodiment of the present disclosure, an area of the top surface of the plurality of first areas 781A1 is formed to be larger than a cross-sectional area of the plurality of openings 111 to minimize the pressing of the first adhesive unit 781. Further, the transference of the boundary of the opening 111 of the mid frame 110 onto the display panel 120 can be suppressed. Specifically, the Young's modulus of the first area 781A1 of the first adhesive unit 781 is higher than that of the second area 781A2 and the first area 781A1 is disposed to overlap the opening 111 of the mid frame 110. Therefore, the phenomenon that the first adhesive unit 781 is pressed during the winding or unwinding of the display panel 120 and the mid frame 110 and during the process of bonding the display panel 120 and the mid frame 110 can be minimized by the first area 781A1 having a rigidity. Specifically, an area of the top surface of the first area 781A1 is larger than the cross-sectional area of the opening 111 so that the pressing phenomenon of the first adhesive unit 781 can be further minimized.

Accordingly, in the display device 700 according to another exemplary embodiment of the present disclosure, the pressing phenomenon of the first adhesive unit 781 which can be caused by the plurality of openings 111 of the mid frame 110 is improved. Further, the deterioration of the visibility caused by the shape of the opening 111 which is visibly recognized by the user can be minimized and the unevenness defect in which the curves are generated on the entire surface of the display panel 120 can be suppressed.

<Second Pattern of Back Plate>

Figure 8A:
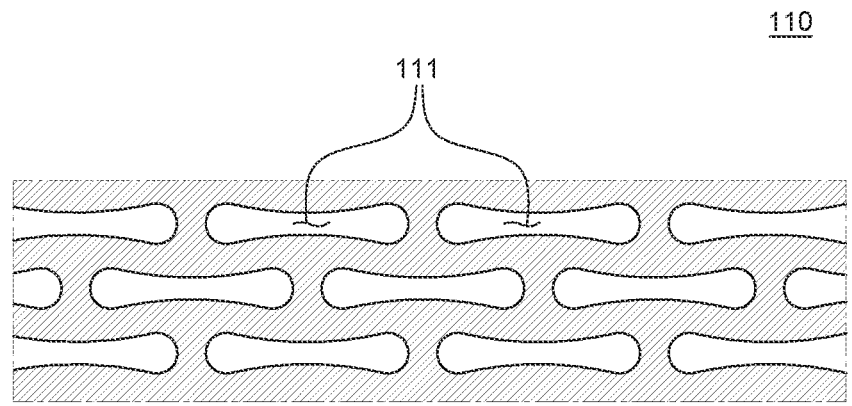
FIG. 8A is an enlarged plan view of a mid frame of a display device according to still another exemplary embodiment of the present disclosure.
Figure 8B:
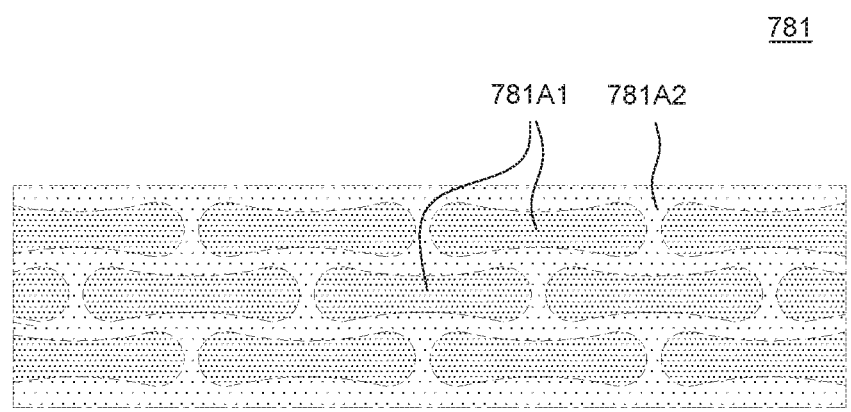
FIG. 8B is an enlarged plan view of a first adhesive unit of a display device according to still another exemplary embodiment of the present disclosure.
Figure 8C:
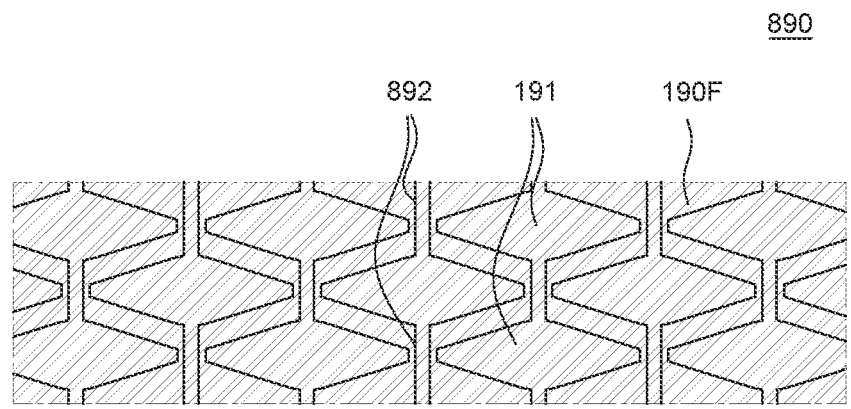
FIG. 8C is an enlarged plan view of a back plate of a display device according to still another exemplary embodiment of the present disclosure.
Figure 8D:
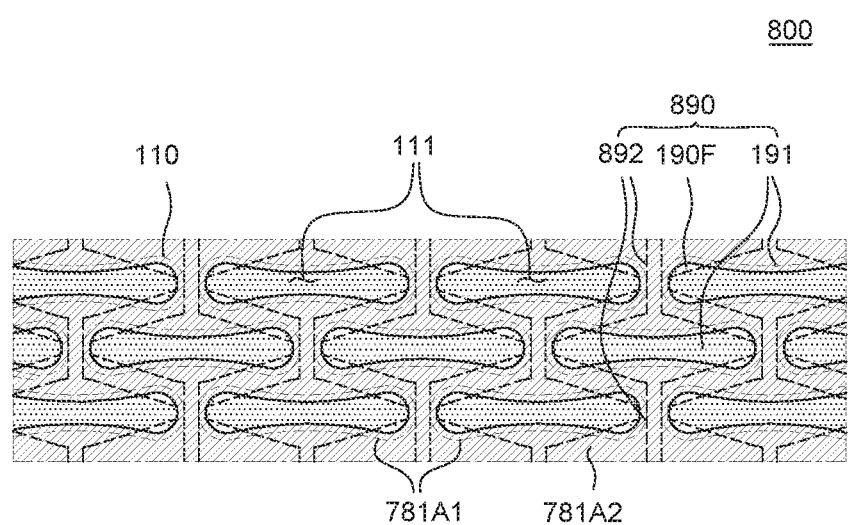
FIG. 8D is an enlarged plan view of an overlapping state of a mid frame, a first adhesive unit, and a back plate of a display device according to still another exemplary embodiment of the present disclosure.
Figure 9:
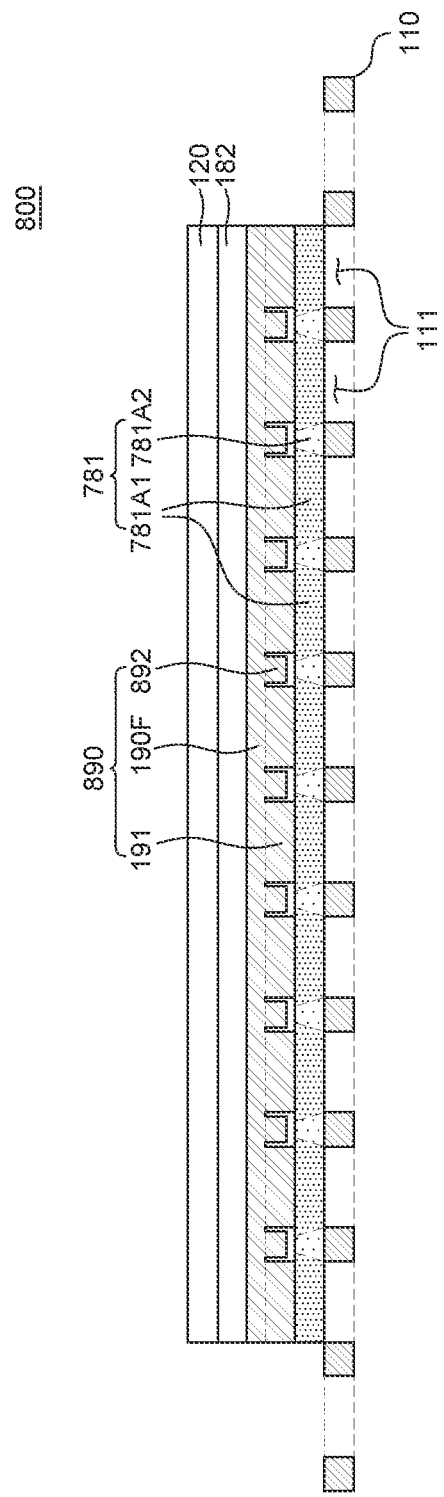
FIG. 9 is a cross-sectional view of a display device according to still another exemplary embodiment of the present disclosure.

FIG. 8A is an enlarged plan view of a mid frame of a display device according to still another exemplary embodiment of the present disclosure. FIG. 8B is an enlarged plan view of a first adhesive unit of a display device according to still another exemplary embodiment of the present disclosure. FIG. 8C is an enlarged plan view of a back plate of a display device according to still another exemplary embodiment of the present disclosure. FIG. 8D is an enlarged plan view of an overlapping state of a mid frame, a first adhesive unit, and a back plate of a display device according to still another exemplary embodiment of the present disclosure. FIG. 9 is a cross-sectional view of a display device according to still another exemplary embodiment of the present disclosure. The only difference or one difference between a display device 800 of FIGS. 8A to 9 and the display device 700 of FIG. 7 is a back plate 890, but the other configurations are the same or substantially the same, so that a redundant description will be omitted or will be briefly provided.

Referring to FIGS. 8A to 9, the back plate 890 further includes a plurality of second patterns 892 which extends to the minor axis direction of the first patterns 191 between the plurality of first patterns 191. The plurality of second patterns 892 is disposed in an area between center points of the first patterns 191. Therefore, the second patterns 892 can overlap an area of the mid frame 110 in which the plurality of openings 111 is not disposed and specifically, the second patterns 892 can overlap the area between a center point of one opening 111 and a center point of the other opening 111 adjacent in the minor axis direction. Therefore, the plurality of second patterns 892 can connect the first patterns 191 which are adjacent to each other in the minor axis direction of the first pattern 191.

Referring to FIG. 9, a thickness of the first pattern 191 is larger than a thickness of the second pattern 892. For example, the thickness of the second pattern 892 is smaller than the thickness of the first pattern 191. As described above, the second pattern 892 can overlap an area of the mid frame 110 in which the plurality of openings 111 is not disposed. Therefore, the stress generated in the area in which the second patterns 892 are disposed can be smaller than a stress generated in an area in which the plurality of openings 111 is disposed. Therefore, the thickness of the second pattern 892 can be smaller than the thickness of the first pattern 191.

Accordingly, in the display device 800 according to still another exemplary embodiment of the present disclosure, the plurality of second patterns 892 is disposed between center points of the plurality of first patterns 191 so that the second patterns 892 overlap an area of the mid frame 110 in which the openings 111 is not disposed. By doing this, it is possible to suppress the visual recognition of the area between the center point of the opening 111 of the mid frame 110 and a center point of the other opening 111 adjacent in the minor axis direction on the display panel 120. Specifically, the back plate 890 having a high rigidity is disposed between the mid frame 110 and the display panel 120 to suppress the strong pressing phenomenon generated along the boundary of the opening 111 of the mid frame 110. Specifically, the first pattern 191 having a large width in the minor axis direction is disposed in an area of the opening 111 having a small width in the minor axis direction to which a strong stress due to the pressing is generated to relieve the stress generated in the area of the opening 111 having a smaller width in the minor axis direction.

Further, the second pattern 892 which has a smaller thickness than the first pattern 191 is disposed between the center point of the opening 111 in which the opening 111 is not disposed in the mid frame 110 and a center point of the other opening 111 adjacent in the minor axis direction to improve the phenomenon that the line pattern is visibly recognized on the display panel 120. Therefore, in the display device 800 according to still another exemplary embodiment of the present disclosure, the deterioration of the visibility due to the area between the center point of the opening 111 and the center point of the other opening 111 adjacent in the minor axis direction which is visibly recognized by the user through the plurality of openings 111 of the mid frame 110 is minimized. By doing this, the unevenness defect in which the curves are generated on the entire surface of the display panel 120 can be suppressed.

Figure 10:
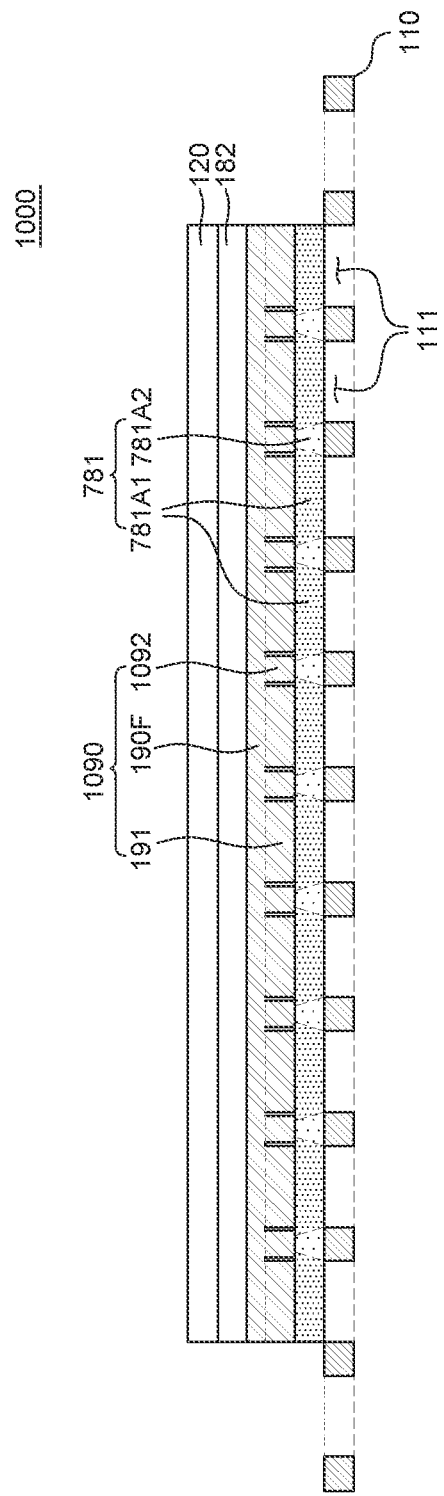
FIG. 10 is a cross-sectional view of a display device according to still another exemplary embodiment of the present disclosure.

FIG. 10 is a cross-sectional view of a display device according to still another exemplary embodiment of the present disclosure. The only difference or one difference between a display device of FIG. 10 and the display device 900 of FIGS. 8A to 9 is a back plate 1090, but the other configurations are the same or substantially the same, so that a redundant description will be omitted or will be briefly provided.

Referring to FIG. 10, in the display device 1000 according to still another exemplary embodiment of the present disclosure, a thickness of a plurality of second patterns 1092 of a back plate 1090 is equal to a thickness of a first pattern 191. Therefore, similarly to the first pattern 191, the second pattern 1092 can also be in contact with the first adhesive unit 181.

In the display device 1000 according to still another exemplary embodiment of the present disclosure, the plurality of second patterns 1092 is disposed between center points of the plurality of first patterns 191. By doing this, it is possible to suppress the visual recognition of the area between the center point of the opening 111 of the mid frame 110 and a center point of the other opening 111 adjacent in the minor axis direction on the display panel 120. Specifically, since the thickness of the second pattern 1092 is equal to the thickness of the first pattern 191, the second pattern 1092 can directly support the first adhesive unit 181. Therefore, in the display device 1000 according to still another exemplary embodiment of the present disclosure, the deterioration of the visibility due to the area between the center point of the opening 111 and the center point of the other opening 111 adjacent in the minor axis direction which is visibly recognized by the user through the plurality of openings 111 of the mid frame 110 is minimized. By doing this, the unevenness defect in which the curves are generated on the entire surface of the display panel 120 can be suppressed.

Further, in the display device 1000 according to still another exemplary embodiment of the present disclosure, the thickness of the second pattern 1092 is equal to the thickness of the first pattern 191, so that a process for manufacturing the back plate 1090 can be simplified. Therefore, an additional time and cost for manufacturing the back plate 1090 can be reduced.

<Base Layer of Second Adhesive Unit>

Figure 11:
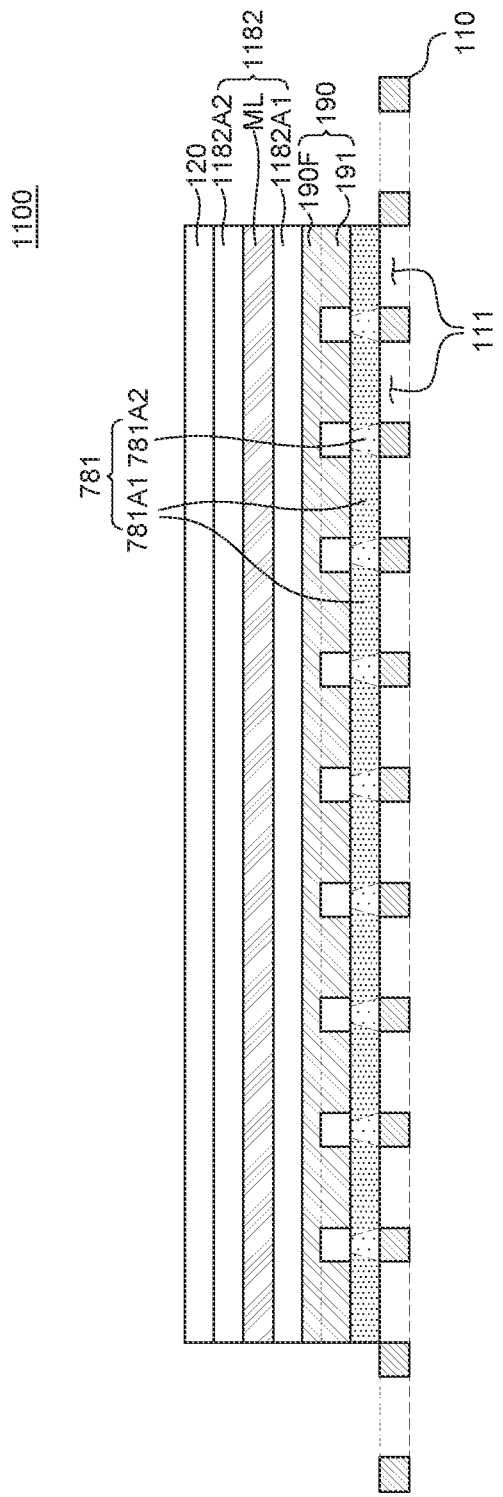
FIG. 11 is a cross-sectional view of a display device according to still another exemplary embodiment of the present disclosure.

FIG. 11 is a cross-sectional view of a display device according to still another exemplary embodiment of the present disclosure. The only difference or one difference between a display device 1100 of FIG. 11 and the display device 700 of FIG. 7 is a second adhesive unit 1182, but the other configurations are the same or substantially the same, so that a redundant description will be omitted or will be briefly provided.

Referring to FIG. 11, the second adhesive unit 1182 includes a first adhesive layer 1182A1, abase layer ML, and a second adhesive layer 1182A2. For example, the second adhesive unit 1182 can have a triple-layered structure in which the first adhesive layer 1182A1 and the second adhesive layer 1182A2 are disposed on both surfaces of the base layer ML.

The first adhesive layer 1182A1 is disposed on the back plate 190. Therefore, the first adhesive layer 1182A1 functions to bond the second adhesive unit 1182 onto the back plate 190.

The first adhesive layer 1182A1 is formed of a material having an adhesiveness and can be a thermosetting or natural curing adhesive. For example, the first adhesive layer 1182A1 can be formed of an acrylic material such as an optical clear adhesive OCA or a pressure sensitive adhesive PSA, but is not limited thereto and can vary depending on the design.

The base layer ML has a rigidity larger than the first adhesive layer 1182A1 to be disposed on the first adhesive layer 1182A1 to support the structure which is bonded to the second adhesive unit 1182.

The base layer ML includes a black material. For example, the base layer ML includes a material which absorbs light. Therefore, a pattern disposed on the rear surface of the base layer ML can be hardly visually recognized from the front surface of the base layer ML.

The second adhesive layer 1182A2 is disposed between the base layer ML and the display panel 120. Therefore, the second adhesive layer 1182A2 functions to bond the second adhesive unit 1182 onto the display panel 120.

The second adhesive layer 1182A2 is formed of a material having an adhesiveness and can be a thermosetting or natural curing adhesive. For example, the second adhesive layer 1182A2 can be formed of an acrylic material such as an optical clear adhesive (OCA) or a pressure sensitive adhesive (PSA), but is not limited thereto and can vary depending on the design.

In the display device 1100 according to still another exemplary embodiment of the present disclosure, the second adhesive unit 1182 includes a first adhesive layer 1182A1, a base layer ML, and a second adhesive layer 1182A2, to further improve the visual recognition of the shape of the opening 111 on the display panel 120. Specifically, the second adhesive unit 1182 has a triple-layered structure in which the first adhesive layer 1182A1, the base layer ML, and the second adhesive layer 1182A2 and the base layer ML including a black material is disposed. Accordingly, it can be difficult to visibly recognize the shape disposed on the rear surface of the base layer ML from the front surface of the base layer ML. For example, it can be difficult to visibly recognize the shape of the mid frame 110 disposed on the rear surface of the base layer ML on the display panel 120 which is disposed on the front surface of the base layer ML.

Therefore, in the display device 1100 according to still another exemplary embodiment of the present disclosure, the second adhesive unit 1182 includes the first adhesive layer 1182A1, the base layer ML, and the second adhesive layer 1182A2, to further improve the visible recognition of the shape of the opening 111 on the display panel 120. Further, the deterioration of the visibility caused by the shape of the opening 111 which is visibly recognized by the user can be minimized.

Figure 12:
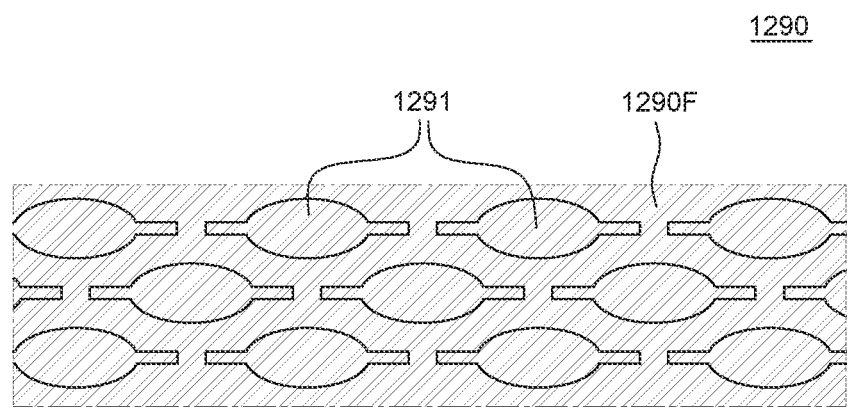
FIGS. 12 to 14 are enlarged plan views of a back plate of a display device according to still another exemplary embodiment of the present disclosure.
Figure 13:
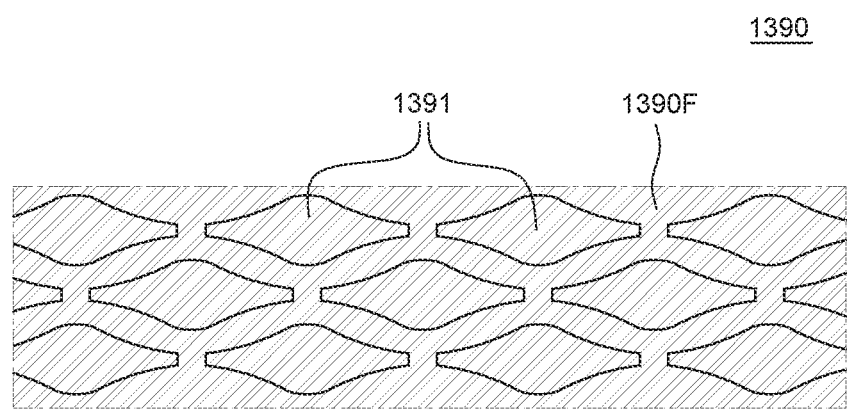
Figure 14:
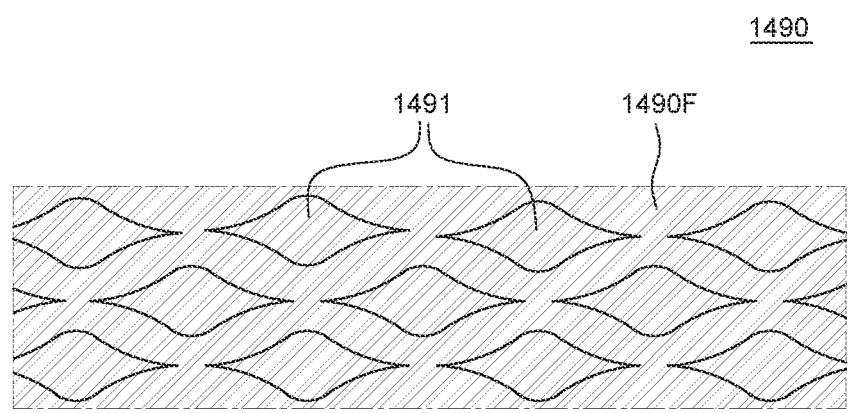

FIGS. 12 to 14 are enlarged plan views of a back plate of a display device according to still another exemplary embodiment of the present disclosure. The only difference or one difference between display devices 1200, 1300, or 1400 of FIGS. 12 to 14 and the display device 100 of FIGS. 1 to 6D is back plates 1291, 1391, and 1491 but the other configurations are the same or substantially the same, so that a redundant description will be omitted or will be briefly provided.

Referring to FIGS. 12 to 14, a plurality of first patterns 1291, 1391, and 1492 of back plates 1290, 1390, and 1490 can be disposed on bottom portions 1290F, 1390F, and 1490F of the back plates 1290, 1390, and 1490. Therefore, the back plates 1290, 1390, and 1490 can protrude toward the mid frame 110 from the bottom portion 1290F, 1390F, and 1490F.

The first patterns 1291, 1391, and 1491 of the back plates 1290, 1390, and 1490 have a shape in which a width in the row direction is larger than a width in the column direction and the width in the column direction is narrower as it is farther from the center points of the first patterns 1291, 1391, and 1491. For example, the first patterns 1291, 1391, and 1491 have a major axis extending in the same direction as the major axis of the opening 111 and has a minor axis extending in the same direction as the minor axis of the opening 111. The width of the first patterns 1291, 1391, and 1491 in the minor axis direction is narrower as it is farther from the center point of the first patterns 1291, 1391, and 1491 in the major axis direction. The shapes of the first patterns 1291, 1391, and 1491 can be various shapes as illustrated in FIGS. 12 to 14, but are not limited thereto. Therefore, the first patterns 1291, 1391, and 1491 of the back plates 1290, 1390, and 1490 can be disposed so as to correspond to the opening 111 of the mid frame 110.

In the display devices 1200, 1300, and 1400 according to still another exemplary embodiment of the present disclosure, the first patterns 1291, 1391, and 1491 of the back plates 1290, 1390, and 1490 are disposed so as to correspond to the opening 111 of the mid frame 110 to suppress the transference of the boundary of the opening 111 of the mid frame 110 onto the display panel 120. Specifically, the back plates 1290, 1390, and 1490 having a high rigidity are disposed between the mid frame 110 and the display panel 120 to suppress the strong pressing phenomenon generated along the boundary of the opening 111 of the mid frame 110.

Specifically, the first patterns 1291, 1391, and 1491 having a large width in the minor axis direction are disposed in an area of the opening 111 having a small width in the minor axis direction to which strong stress due to the pressing is generated to relieve the stress generated in the area of the opening 111 having a smaller width in the minor axis direction. Accordingly, in the display devices 1200, 1300, and 1400 according to the exemplary embodiment of the present disclosure, the deterioration of the visibility caused by the shape of the opening 111 of the mid frame 110 which is visibly recognized by the user is minimized. Further, the unevenness defect in which the curves are generated on the entire surface of the display panel 120 can be suppressed.

The exemplary embodiments of the present disclosure can also be described as follows:

According to an aspect of the present disclosure, a display device including a display panel, a mid frame which is disposed below the display panel and includes a plurality of openings, a back plate which is disposed between the display panel and the mid frame and includes a plurality of first patterns protruding toward the mid frame and corresponding to the plurality of openings, and a first adhesive unit which is disposed between the mid frame and the back plate and includes a plurality of first areas overlapping the plurality of openings and a second area which encloses the plurality of first areas and is malleable than the first areas.

A Young's modulus of the plurality of first areas can be higher than that of the second area.

The plurality of first areas completely can overlap the plurality of openings with the same shape and the same size.

A bottom surface of the plurality of first areas overlap the plurality of openings and cross-sectional areas of the plurality of first areas can be gradually increased from the bottom surface to a top surface on a cross-section.

The opening has a shape in that a width of a row direction is larger than a width of a column direction and the width of the column direction is narrower as it is closer to a center point of the opening and the first pattern has a shape in that a width of a row direction is larger than a width of a column direction and the width of the column direction is narrower as it is farther from a center point of the first pattern, and the center point of the opening and the center point of the first pattern can be disposed to overlap.

The back plate can further include a plurality of second patterns which extends in a column direction between the plurality of first patterns.

The plurality of second patterns can be disposed between center points of the first patterns.

A thickness of the first pattern can be larger than a thickness of the second pattern.

A thickness of the first pattern can be equal to a thickness of the second pattern.

The display device can further include a second adhesive unit which is disposed between the back plate and the display panel. The second adhesive unit includes a first adhesive layer disposed on the back plate, a base layer which is disposed on the first adhesive layer and has a rigidity larger than the first adhesive layer, and a second adhesive layer disposed between the base layer and the display panel.

The base layer can include a black material.

According to another aspect of the present disclosure, a display device including a display panel in which an active area is defined, a mid frame which supports a rear surface of the display panel and includes a plurality of openings, a first adhesive unit which includes a plurality of first areas overlapping the plurality of openings and a second area which is malleable than the first areas and is disposed between the mid frame and the display panel, and a back plate which is disposed between the first adhesive unit and the display panel and includes a plurality of first patterns disposed to correspond to a position of the plurality of openings.

The second area is disposed to enclose the plurality of first areas and has a Young's modulus which can be smaller than that of the plurality of first areas.

The plurality of first areas can have the same shape as the plurality of openings.

A cross-sectional area of the plurality of first areas can be the same as a cross-sectional area of the plurality of openings.

An area of a top surface of the plurality of first areas can be larger than a cross-sectional area of the plurality of openings.

The opening has a major axis and a minor axis, a width of the opening in a minor axis direction is narrower as it is closer to a center point of the opening in a major axis direction, the first pattern has a major axis extending in the same direction as the major axis of the opening and has a minor axis extending in the same direction as the minor axis of the opening, and a width of the first pattern in the minor axis direction can be narrower as it is farther from a center point of the first pattern in the major axis direction.

The back plate can further include a second pattern which extends in the minor axis direction of the first pattern between the plurality of first patterns.

The first pattern can have a thickness which is equal to a thickness of the second pattern.

The first pattern can have a thickness which is larger than a thickness of the second pattern.

The display device can further include a second adhesive unit which includes a first adhesive layer, a base layer, and a second adhesive layer is disposed between the back plate and the display panel and the base layer can include a black material.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto.

Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:
1. A display device, comprising:
a display panel;

a mid frame which is disposed below the display panel, and includes a plurality of support areas and a malleable area, wherein the malleable area includes a plurality of openings;

a back plate which is disposed between the display panel and the mid frame, and includes a plurality of first patterns protruding toward the mid frame, the plurality of first patterns overlapping the plurality of openings of the malleable area; and a first adhesive unit which is disposed between the mid frame and the back plate, and includes a plurality of first areas overlapping the plurality of openings and a second area enclosing the plurality of first areas, the second area being malleable than the plurality of first areas, wherein the plurality of first areas in the first adhesive unit completely overlaps the plurality of openings in the mid frame with a same shape and a same size.

2. The display device according to claim 1, wherein a Young's modulus of the plurality of first areas in the first adhesive unit is higher than a Young's modulus of the second area in the first adhesive unit.

3. The display device according to claim 1, wherein the back plate further includes a plurality of second patterns which extends in a column direction between the plurality of first patterns.

4. The display device according to claim 3, wherein the plurality of second patterns is disposed between center points of the plurality of first patterns.

5. The display device according to claim 4, wherein for at least one of the plurality of first patterns, a thickness of each first pattern is larger than a thickness of one of the plurality of second patterns.

6. The display device according to claim 4, wherein for at least one of the plurality of first patterns, a thickness of the first pattern is equal to a thickness of one of the plurality of second patterns.

7. The display device according to claim 1, further comprising:
a second adhesive unit which is disposed between the back plate and the display panel,
wherein the second adhesive unit includes:
a first adhesive layer disposed on the back plate;
a base layer which is disposed on the first adhesive layer, and has a rigidity larger than the first adhesive layer; and
a second adhesive layer disposed between the base layer and the display panel.

8. The display device according to claim 7, wherein the base layer includes a black material.

9. A display device, comprising:
a display panel;
a mid frame which is disposed below the display panel, and includes a plurality of support areas and a malleable area, wherein the malleable area includes a plurality of openings;
a back plate which is disposed between the display panel and the mide frame, and includes a plurality of first patterns protruding toward the mid frame, the plurality of first patterns overlapping the plurality of openings of the malleable area; and
a first adhesive unit which is disposed between the mid frame and the back plate, and includes a plurality of first areas overlapping the plurality of openings and a second area enclosing the plurality of first areas, the second area being more malleable than the plurality of first areas, wherein a bottom surface of the plurality of first areas in the first adhesive unit overlaps the plurlaity of openings in the mid frame, and
cross-sectional areas of the plurality of first areas are gradually increased from the bottom surface to a top surface of the plurality of first areas on a cross-section.

10. A display device, comprising:
a display panel;
a mid frame which is disposed below the display panel, and includes a plurality of support areas and a malleable area, wherein the malleable area includes a plurailty of openings;
a back plate which is disposed between the display panel and the mid frame, and includes a plurality of first patterns protruding toward the mid frame, the plurality of first patterns overlappying the plurality of openings of the malleable area; and
a first adhesive unit which is disposed between the mid frame and the back plate, and includes a plurality of first areas overlapping the plurality of openings and a second area enclosing the plurality of first areas, the second area being more malleable than the plurality of first areas,
wherein for at least one of the plurality of openings, each opening has a shape in that a width of a row direction is larger than a width of a column direction and the width of the column direction is narrower as it is closer to a center point of the opening, and the first pattern corresponding to the opening has a shape in that a width of a row direction is larger than a width of a column direction and the width of the column direction is narrower as it is farther from a center point of the first pattern, and
the center point of the opening and the center point of the first pattern are disposed to overlap each other.

11. A display device, comprising:
a display panel in which an active area is defined;
a mid frame which supports a rear surface of the display panel, and includes a plurality of support areas and a malleable area, wherein the malleable area includes a plurality of openings;
a first adhesive unit which includes a plurality of first areas overlapping the plurality of openings and a second area which is malleable than the first areas, the second area being disposed between the mid frame and the display panel; and
a back plate which is disposed between the first adhesive unit and the display panel, and includes a plurality of first patterns overlapping a position of the plurality of openings of the malleable area,
wherein the plurality of first areas has a same shape as the plurality of openings, and
wherein a cross-sectional area of the plurality of first areas is same as a cross-sectional area of the plurality of openings.

12. The display device according to claim 11, wherein the second area is disposed to enclose the plurality of first areas, and has a Young's modulus which is smaller than Young's modulus of the plurality of first areas.

13. The display device according to claim 11, wherein each of the plurality of openings has a major axis and a minor axis, a width of the opening in a minor axis direction is narrower as it is closer to a center point of the opening in a major axis direction,
the first pattern corresponding to the opening has a major axis extending in the same direction as the major axis of the opening, and has a minor axis extending in the same direction as the minor axis of the opening, and a width of the first pattern in the minor axis direction is narrower as it is farther from a center point of the first pattern in the major axis direction.

14. The display device according to claim 13, wherein the back plate further includes a second pattern which extends in the minor axis direction of the first pattern between the plurality of first patterns.

15. The display device according to claim 14, wherein each of the plurality of first patterns has a thickness which is equal to or greater than a thickness of the second pattern.

16. The display device according to claim 11, further comprising:

a second adhesive unit which includes a first adhesive layer, a base layer, and a second adhesive layer disposed between the back plate and the display panel, wherein the base layer includes a black material.

17. A display device, comprising:

a display panel in which an active area is defined;

a mid frame which supports a rear surface of the display panel, and includes a plurality of support areas and a malleable area, wherein the malleable area includes a plurality of openings;

a first adhesive unit which includes a plurality of first areas overlapping the plurality of openings and a second area which is more malleable than the first areas, the second area being disposed between the mid frame and the dispaly panel; and a back plate which is disposed between the first adhesive unit and the display panel, and includes a plurality of first patterns overlapping a position of the plurality of openings of the malleable area, wherein the plurality of first areas has a same shape as the plurlaity of openings, and wherein an area of a top surface of the plurality of first areas is larger than a cross-sectional area of the plurality of openings.

* * * * *